April 29, 1958
M. SAPOFF ET AL
2,832,219
HYPSOMETERS
Filed June 2, 1955
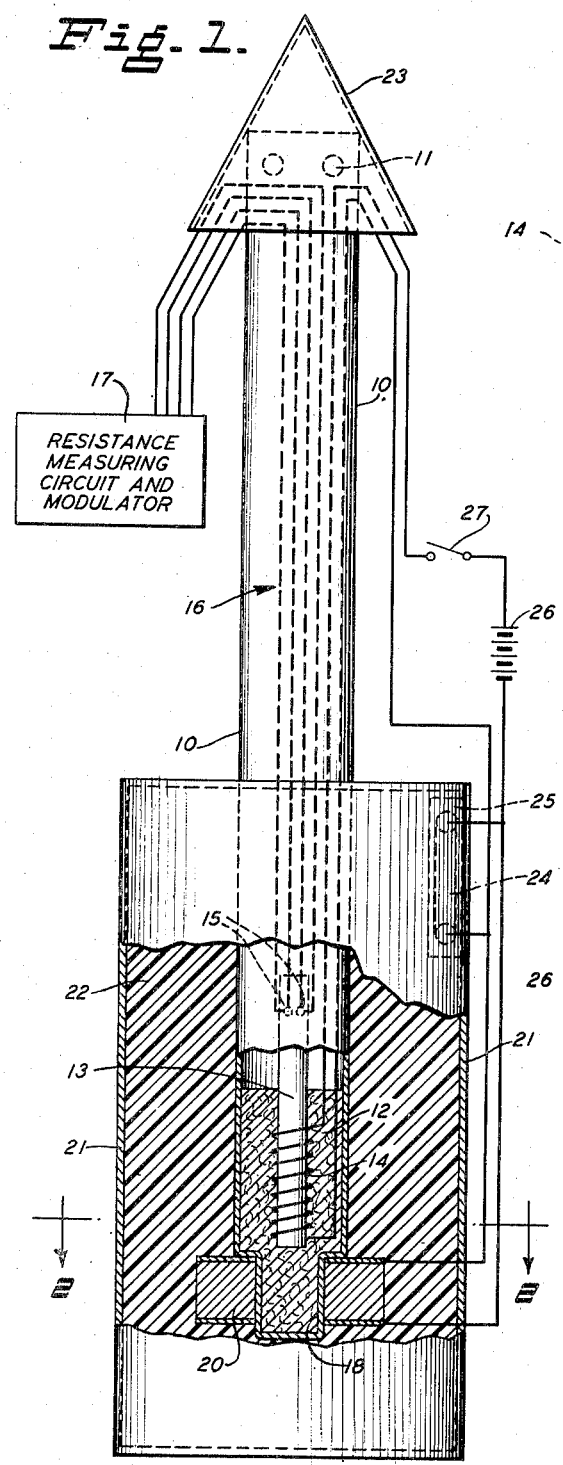
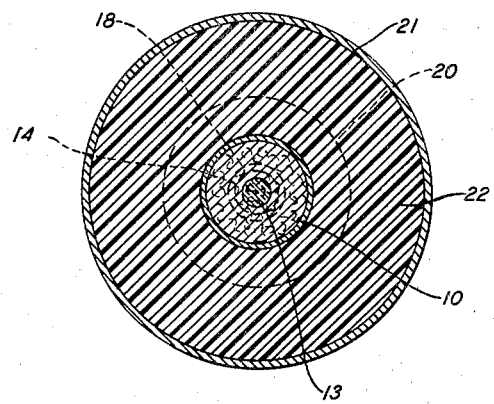
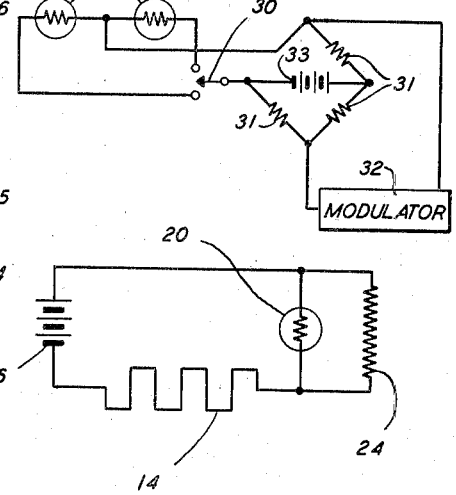
INVENTOR.
MEYER SAPOFF
ROBERT S. GOODYEAR
BY
*Albert F. Kronman*
ATTORNEY

United States Patent Office 2,832,219
Patented Apr. 29, 1958

2,832,219

HYPSOMETERS

Meyer Sapoff, Union, and Robert S. Goodyear, Scotch Plains, N. J., assignors to Victory Engineering Corporation, Union, N. J., a corporation of Delaware Application June 2, 1955, Serial No. 512,738

13 Claims. (Cl. 73—384)

This invention relates to a pressure measuring apparatus of the hypsometer type which includes compensating components for regulating the amount of energy supplied to parts of the hypsometer circuit. A hypsometer generally comprises a liquid enclosed in a container with or without means for heating the liquid. A temperature responsive element is arranged to measure the temperature of the vapor of the liquid at a point adjacent to the liquid surface. Since the boiling point of a liquid varies in accordance with the ambient pressure, the temperature of the boiling liquid is a function of the pressure.

Some prior hypsometers have positioned the temperature measuring device beneath the surface of the liquid. This arrangement has not proved satisfactory because at low pressure a large amount of super-heating is possible and the results then are in error. Other prior hypsometers have positioned the temperature responsive device above the liquid surface, thereby sensing the temperature of the vapor atmosphere. Such an arrangement is susceptible to super-cooling effects due to the fact that the vapor of the liquid may be mixed with cold air streams from the outside of the container.

The present invention avoids these difficulties by positioning the temperature sensitive devices within a wick which is surrounded by a heater element. This arrangement has been found to eliminate the erratic and inaccurate results previously encountered in this type of instrument.

Many prior art hypsometers were restricted to a small range of pressures due to the fact that a constant supply of energy was applied to the heater element. If the heater current is large the device measures only pressures above a minimum value. If the heater energy is reduced the hypsometer is accurate at very low pressures only. The present invention controls the heater current in response to the temperature of the liquid and thereby produces an increased range which is considerably greater than prior art devices.

An object of the present invention is to provide an improved pressure measuring instrument which avoids one or more of the disadvantages and limitations of prior art arrangements.

Another object of the present invention is to reduce the size and weight of hypsometers so that they may be more easily carried aloft into the upper atmosphere.

A further object of the present invention is to increase the range and operating time of pressure measuring instruments.

An object of the invention is to conserve the liquid within a hypsometer by providing heat insulation adjacent to the heater and liquid section, and a condensing surface adjacent to that part of the container which is open to the atmosphere.

Another object of the invention is to provide a hypsometer structure which may be operated for short periods of time in any position.

The invention includes a liquid with a high boiling point enclosed within a container with means for heating the liquid to its boiling temperature. A temperature responsive element, such as a thermistor is positioned within a wick which is in contact with the liquid. An electric heater is wound around the wick and the current through the heater is controlled by the temperature as measured by a second control thermistor.

The invention consists of the construction, combination and arrangement of parts, as herein illustrated, described and claimed.

In the accompanying drawings, forming a part hereof, is illustrated a complete form of embodiment of the invention, in which:

Figure 1 is a side view of a complete embodiment of a hypsometer according to the present invention, with some parts in section and with a schematic indication of the circuit wiring.

Figure 2 is a cross-sectional view of the hypsometer, taken along lines 2—2 of Figure 1.

Figure 3 is a schematic wiring diagram showing the operating circuits of the hypsometer, according to the present invention.

Referring to the drawings, and specifically to Figures 1 and 2, 10 indicates an elongated container having in the bottom thereof a liquid saturated glass wool packing 12. The upper portion of the container 10 is open to the surrounding atmosphere by way of one or more holes 11, which are provided in the wall of the container near the top thereof. It is to be understood that in such uses of the hypsometer where the instrument will remain in a vertical position throughout, a supply of a stable high boiling point liquid (not shown) may be used in place of the glass wool packing 12 having absorbed therein said liquid. In the preferred embodiment, the packing 12 and the liquid which may be for example, methylcyclopentane ($C_6H_{12}$), occupies about one-quarter of the volume of the entire container 10.

A wick 13, formed of some inert material such as Fiber-glas, is disposed within the container 10, so that a portion of said wick is surrounded by the packing 12, and the remainder of the wick extends upwardly therefrom in the direction of the top of the container 10. An electric heater 14 is provided within the packing 12 and around that portion of the Fiberglas wick 13 which is in contact with the said packing.

One or more thermistors 15 are incorporated within the upper portion of the wick structure, which extends above the packing 12 into the container 10. The thermistors 15 are connected by conductors 16 to an external circuit, generally indicated at 17 in Figure 1, and shown in more detail in Figure 3. The bottom portion of the containers 10 may be constricted as indicated at 18, and a control thermistor 20 or thermistor network, comprising a shunt resistor and one thermistor or several thermistors with or without associated resistors, disposed about the constricted portion. The operation of the control thermistor 20 in controlling the heater current will be hereinafter more fully described.

The lower portion of the container 10, together with all of the elements associated therewith, is encased within a housing 21 and surrounded by a suitable heat-insulating material 22, such as "Styrofoam" (expanded polystyrene) or the like, which material substantially fills the space between the bottom portion of the container 10 and the housing 21. The heat insulation protects the bottom portion of the container 10 from being influenced by the temperature of the atmosphere, and also acts as a mechanical securing means for holding the container 10 in axial alignment with the housing 21. The top of the container 10 is protected by a shield 23 which may have the conical shape shown in the drawing, or may be of any other form which will keep rain and dust from the interior of the container 10 and still provide access, through the holes 11, to the outside atmosphere.

For the operation of the device it will generally be necessary to connect a shunt resistor 24 in parallel with the control thermistor 20. The shunt may be mounted on the inside surface of housing 21 on a suitable insulator mount 25. The shunt resistor 24 and control thermistor 20 are computed for the temperature variation of a standard atmosphere.

Where a heat insulating material 22 having a substantially rigid or self supporting structure such as "Styrofoam" is used, the housing 21 may be dispensed with. It will also be unnecessary to provide an insulator mount 25 in such a structure since the shunt resistor 24 can be secured directly to the rigid insulation.

The operation of this device is as follows: Power is supplied by any suitable potential source, such as the battery 26 when the switch 27 is closed. The current flows through the heater 14 and boils the liquid in the packing 12, heating the thermistors 15 in the wick 13 to a boiling temperature, thereby altering their resistances and permitting a voltage or current indication to be made in a measuring circuit 17, which voltage is proportional to the atmospheric pressure within the container. It has been found that the use of thermistors 15 in one end of the wick with a heater element at the other end, produces the most accurate temperature measurement of the boiling point. Since the thermistors 15 are within the body of the wick 13, there is no danger that they may be cooled below the boiling point of the liquid by currents of air which may be injected into the container 10, due to gusts of wind or abrupt changes in velocity of the instrument. Also, such an arrangement protects the thermistor against the effects of super-heating, sometimes called the "spheroidal" state. The fibers of the wick 13 promote more uniform boiling of the liquid imbibed therein.

When the liquid in the packing 12 boils, it gives off a vapor which rises in the container, moving toward the holes 11, but because the upper part of the container 10 is in contact with the atmosphere and relatively cold, the vapor condenses on the inside wall, and runs down to the base of the said container, and is absorbed by the packing 12, which surrounds the wick 13. This arrangement which exposes a considerable area of the container 10 to the atmosphere, insures the retention of the liquid within the container with very little loss, thereby extending the operational range of the hypsometer.

The circuits shown in Figure 3 illustrate one of the forms which may be used with this device. Thermistors 15 are connected in one arm of a Wheatstone bridge, and the resistors 31 are connected in the remaining arms. A switch 30 is employed to permit readings to be taken from either or both thermistors during flight.

The source of potential 33 is applied to the bridge. It will be obvious that a change in the resistance of the thermistors 15 will produce a large change in the unbalanced voltage which is applied to a modulation circuit 32.

The heater circuit for the hypsometer includes a source of potential 26 in series with a control thermistor 20 with its shunt 24 and a heater coil 14.

Any type of suitable modulation circuit may be employed with the circuits shown in Figure 3. Alternately, modulating circuits such as are described in the Department of the Army Technical Manual TM 11-2432 Radiosonde AN/AMT-4, may be used without a Wheatstone bridge, the thermistor being connected directly into said modulation circuit.

It will be apparent from an examination of the previously described structure that the use of the packing material 12, having a liquid therein, permits the device to be operated in any position without loss of liquid due to spilling. By absorbing the liquid within the Fiber-glas packing, sporadic bursts of nucleate boiling which often occur at low pressure and which result in super-heated liquid being splashed upon the thermistors are avoided.

Such bursts have a tendency to upset the accuracy of readings taken from the sensing element. A more uniform boiling is also achieved by reason of the rough surface of the packing in contact with the liquid.

With a given amount of liquid the range of operation of the present device is greatly extended over that of previously known hypsometers. Alternately, an equal range can be provided in the present device using a smaller amount of liquid than would be required for a conventional hypsometer. It has therefore been possible to make hypsometers of reduced size and weight for use in aerial observations.

The condensing feature, whereby the liquid which boils out of the packing material 12 is caused to return to said packing material, further extends the operational life of the hypsometer.

From the foregoing, it will be seen that there has been provided a highly efficient pressure measuring apparatus, having advantages of extended life and a minimum size and weight heretofore unknown in the art.

Having thus fully described the invention, what is claimed as new and desired to be secured by Letters Patent of the United States, is:

1. A pressure measuring apparatus comprising, a container open at one end to ambient pressure, a supply of liquid in said container, a heater in intimate contact with said liquid for heating the liquid to its boiling point, a wick within the container in communication with the liquid, a temperature-responsive element incorporated within the wick, a control element resistor in thermal communication with said liquid, a source of potential connected to said control element resistor and the heater and means for measuring the temperature response of the temperature-responsive element in the presence of the boiling liquid to ascertain the ambient pressure.

2. A pressure measuring apparatus comprising, a container open at one end to atmospheric pressure, a quantity of packing material in the container adjacent the closed end thereof, a liquid absorbedly carried by the packing material, a heater in intimate contact with the packing for heating the liquid to its boiling point, a wick within the container, said wick being partially embedded in the packing, a temperature-responsive element incorporated within the wick, above the packing, a control resistor in thermal communication with the liquid bearing packing, said resistor having a resistance which increases as its temperature is lowered, a source of potential connected in series with the resistor and heater and means for measuring the temperature response of the temperature-responsive element in the presence of the boiling liquid to ascertain the ambient pressure.

3. A presure measuring apparatus comprising, a container open at one end to atmospheric pressure, a quantity of packing material in the container adjacent the closed end thereof, a liquid absorbedly carried by the packing material, a heater in intimate contact with the packing for heating the liquid to its boiling point, a wick within the container, said wick being partially embedded in the packing, a temperature-responsive element consisting of a thermistor incorporated within the wick, above the packing, a control resistor in thermal communication with the liquid bearing packing, said resistor having a resistance which increases as its temperature is lowered, a source of potential connected in series with the resistor and heater and means consisting of an electrical circuit connected to the temperature-responsive element for measuring the temperature response of the temperature-responsive element in the presence of the boiling liquid to ascertain the ambient pressure.

4. A pressure measuring apparatus in accordance with claim 2, wherein the heater is wound around that portion of the fibrous wick which is surrounded by the packing.

5. A pressure measuring apparatus in accordance with claim 2, wherein the packing, wick, heater and control resistor are surrounded by a heat insulating material.

6. A pressure measuring apparatus in accordance with claim 2, wherein a portion of said container is exposed to the atmosphere for cooling the container walls and causing condensation of the liquid vapor.

7. A pressure measuring apparatus in accordance with claim 2, wherein said electrical circuit means includes a four-armed Wheatstone bridge having the temperature-responsive element as one of the arms thereof.

8. A pressure measuring apparatus in accordance with claim 2, wherein said container comprises an elongated cylindrical container, closed at the bottom and having one or more openings to the atmosphere adjacent to its top end.

9. A pressure measuring apparatus in accordance with claim 2, wherein the electrical power supplied by said source of potential to the heater is varied by the control resistor to provide less heat when the temperature of the liquid is lowered.

10. A pressure measuring apparatus in accordance with claim 3, wherein said source of potential is connected in series with the control resistor, the heater, and said electrical circuit means.

11. A pressure measuring apparatus in accordance with claim 3, wherein said electrical circuit means is connected to a modulating means which controls a radiant energy source to transmit energy having a characteristic which is proportional to the pressure within the said container.

12. A pressure measuring apparatus in accordance with claim 3, in which the liquid is a stable high boiling-point fluid.

13. A pressure measuring apparatus in accordance with claim 3, in which the liquid is methylcyclopentane.

References Cited in the file of this patent
UNITED STATES PATENTS

| | | |
|---|---|---|
| 2,713,795 | Herndon, et al. | July 26, 1955 |
| 2,741,921 | Windsor, et al. | Apr. 17, 1956 |

OTHER REFERENCES

Koppl: Review of Scientific Instruments, vol. 18 #11, 1947, page 851.

Vincent et al.: Proceedings of the Physical Society of London, vol. 51, November 1939, pages 1005, 1006, 1007.